United States Patent [19]

Nelson

[11] 4,291,366

[45] Sep. 22, 1981

[54] SWITCHING REGULATED POWER SUPPLY

[75] Inventor: Hilding E. Nelson, Scandia, Minn.

[73] Assignee: NCR Corporation, Dayton, Ohio

[21] Appl. No.: 78,352

[22] Filed: Sep. 24, 1979

[51] Int. Cl.³ .......................................... H02M 7/217
[52] U.S. Cl. ....................................... 363/17; 363/37; 363/82
[58] Field of Search ...................... 363/17, 26, 37, 80, 363/82, 132

[56] References Cited

U.S. PATENT DOCUMENTS

| | | | |
|---|---|---|---|
| 3,916,283 | 10/1975 | Burrows | 363/26 |
| 4,063,306 | 12/1977 | Perkins et al. | 363/17 |
| 4,092,708 | 5/1978 | Gerding | 363/80 X |
| 4,126,891 | 11/1978 | Suzuki et al. | 363/26 |
| 4,127,894 | 11/1978 | Bishop et al. | 363/80 X |

*Primary Examiner*—A. D. Pellinen
*Attorney, Agent, or Firm*—J. T. Cavender; Edward Dugas; Arthur A. Sapelli

[57] ABSTRACT

A switching regulated power supply operates over a broad range of input voltage and frequency, and outputs direct current power for computer equipment and the like. The power supply can be paralleled with identical power supplies, thereby satisfying any predetermined power requirement. A charge pump bulk voltage balancing circuit balances voltage on capacitors in an input rectifier and filter circuit. A flux sensing circuit senses magnetizing current in the secondary of a power transformer and the integrated signal is incorporated into pulse duration modulation to achieve dynamic flux balancing of the power transformer through a feedback loop. Output voltage of the power supply connects to a control supply of the power supply, providing power feedback to the control supply to maintain the operating parameters of the power supply as long as the output voltage does not fall below a predetermined level. The power feedback permits the control supply of the power supply to operate the power supply when input voltage is interrupted for a brief time interval. A base drive circuit separates the base drive control signals and power for reliability and drives each of the power transistors through separate transformers. A timing generator provides timing signals used for pulse duration modulation of the power transistors' base switching signals.

15 Claims, 9 Drawing Figures

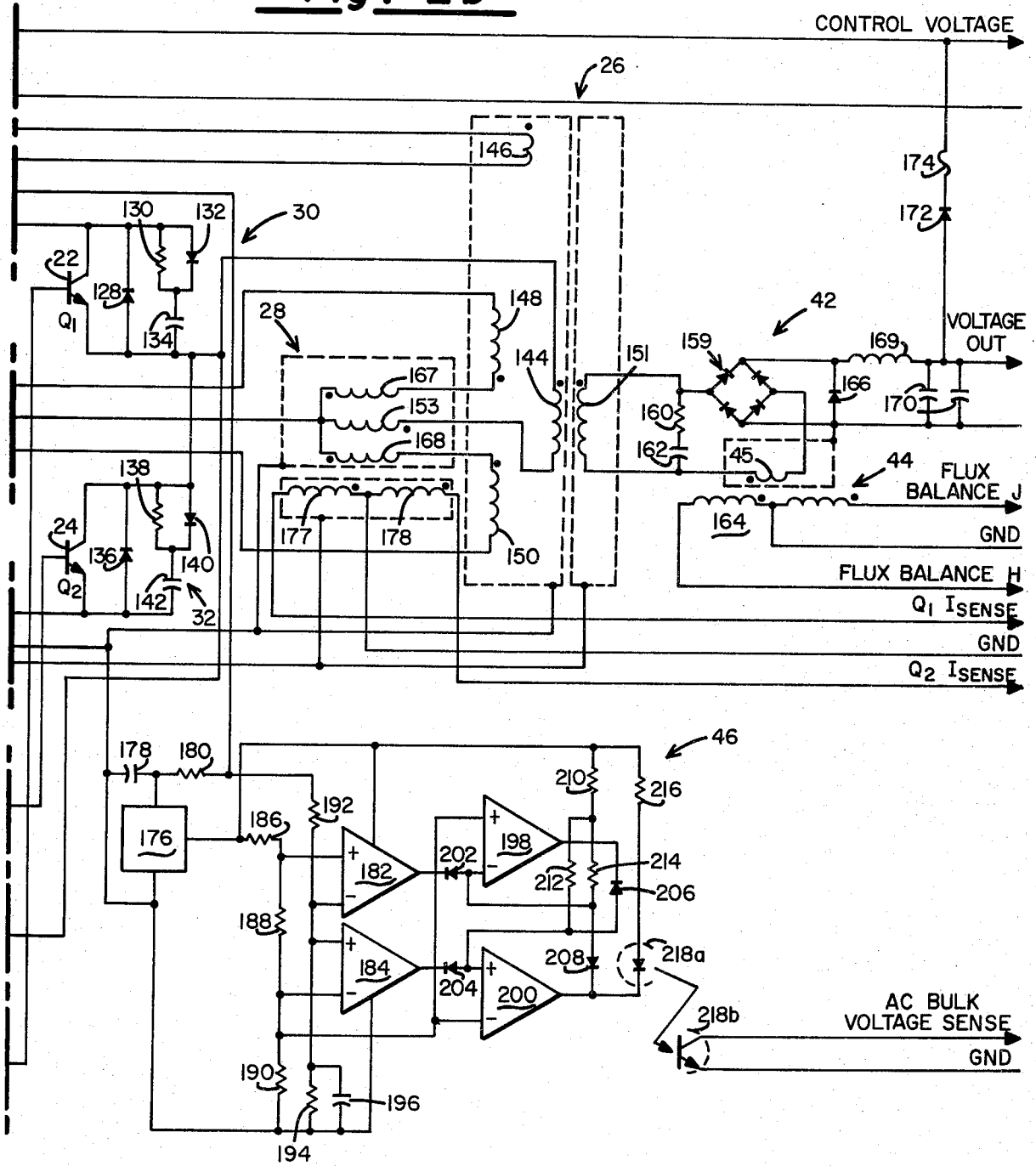

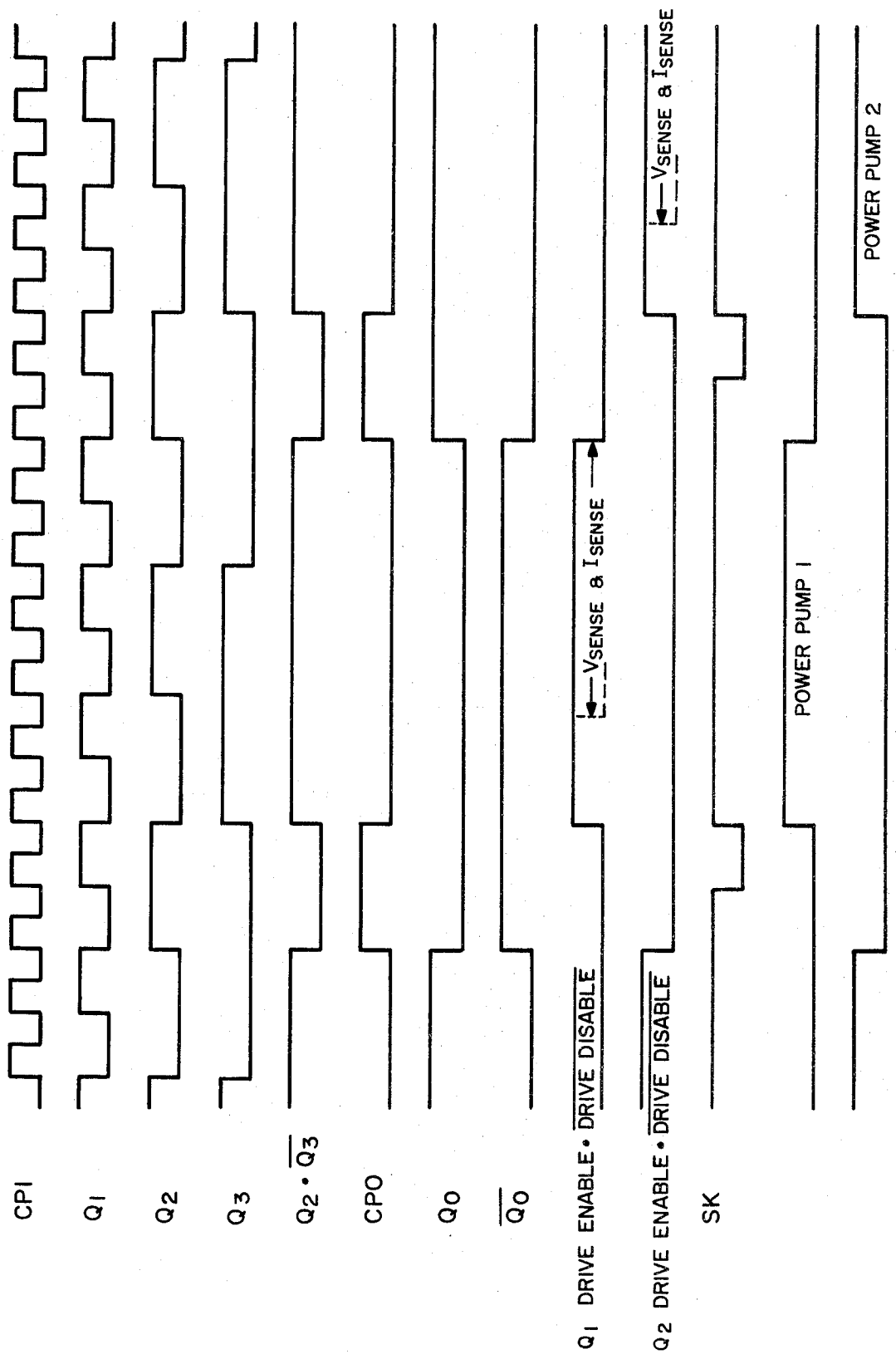

4,291,366

SWITCHING REGULATED POWER SUPPLY

BACKGROUND OF THE INVENTION

The present invention relates generally to a power supply, and more particularly, pertains to a switching regulated power supply for computer equipment and the like.

The following list of patents are believed to be relevant to the subject matter of the present application:

U.S. Pat. No. 3,659,185, "Volt-Second Unbalanced Compensated Two Core Power Transformer", James M. Gregorich, Apr. 25, 1972;

U.S. Pat. No. 3,873,903, "Volt-Second Balancing Means For A High Frequency Switching Power Supply", Philip W. Koetsch et al., Mar. 25, 1975;

U.S. Pat. No. 3,916,286, "Switching Power Supply Common Output Filter", Glenn C. Waehner, Oct. 28, 1975;

U.S. Pat. No. 3,935,526, "DC-To-DC Converter", Yasuiji Kamata et al., Jan. 27, 1976; and U.S. Pat. No. 4,017,786, "Transformer Saturation Control Circuit For A High Frequency Switching Power Supply", Joseph C. Jensen, Apr. 12, 1977.

In the field of switching regulated power supplies, it has been a general practice to utilize a fairly small capacitor, in the range of a few microfarads, in series with the primary winding of a power transformer. The current pulses through the primary winding are balanced by this capacitor, and a voltage charge develops across the capacitor if there is any unbalance. In practical power supply circuits the optimum size selection of this capacitor must be compromised, resulting in the disadvantage that the capacitor does not prevent saturation of the power transformer but only limits the degree of saturation of the power transformer. Since direct current cannot pass through the capacitor, there is a limit as to the amount of flux that can be developed in one direction in the power transformer. Also, the power transistors of the capacitively balanced switching regulated power supply are subjected to an excessive stress level, and while the power transistors may survive this stress level, the power transistors are subjected to incremental cumulative damage.

Furthermore, the capacitor is an expensive electrical component, physically quite large, and decreases the margins of operation because the capacitor operates by building a voltage across itself. This voltage subtracts from the voltage that is available to drive the power transformer and therefore, all the input voltage is not impressed across the transformer primary windings. The voltage drop across the capacitor can be minimized by increasing the capacitor size, but this increases the stress levels the power transistors must withstand.

Prior art switching regulated power supplies have typically been designed for specific power and load requirements. As a consequence, if a larger power requirement is necessary, it was usually necessary to develop a corresponding power supply meeting that power requirement. The prior art power supplies have not lended themselves to modularized paralleling to satisfy larger power requirements.

The present invention overcomes the shortcomings of the prior art power supplies by providing a switching regulated power supply for modular connection and having charge pump bulk voltage balancing and dynamic flux balancing.

SUMMARY OF THE INVENTION

The general purpose of the present invention is to provide a switching regulated power supply which operates from fifty to sixty cycles alternating current over broad ranges of voltage centered about 115 volts or 230 volts AC. The supply outputs filtered direct current voltage which can be subsequently converted down to lower voltages for computer logic circuitry and the like.

According to one embodiment of the present invention, there is provided a switching regulated power supply including power head for converting an alternating current voltage input to a direct voltage output. The power head includes an input rectifier and filter having filter capacitors, a power transformer connected to the input rectifier and filter, an output rectifier and filter connected to the power transformer, and a pair of power transistors connected between the input rectifier and filter and the power transformer. A charge pump for balancing the voltage charge on the filter capacitors is connected between the power transformer and the filter capacitors. Also provided are control and flux balancing circuits for alternately switching the power transistors to balance the flux in the power transformer.

More specifically there is provided a switching regulated power supply including an input rectifier and filter circuit and a control transformer, rectifier and filter circuit, each connected to a source of alternating current and respectively outputting a bulk voltage and an unregulated control voltage; a voltage reference circuit connected to the unregulated control voltage; a regulated control voltage supply connected to the output of the voltage reference circuit; a free-running timing generator outputting a plurality of timing signals and outputting a sync signal which connects to the regulated control voltage supply; Q1 and Q2 power transistors connected between the input rectifier and filter circuit through load line shapers to one side of the primary of a power transformer; additional load line shapers connected across the output of the power transistors; a current limit sensing transformer connected between the other side of the primary of the power transformer and the input rectifier and filter circuit; charge pump voltage balancing circuits connected between charge pump windings of the power transformer and the input rectifier and filter circuit. The secondary of the power transformer outputting a direct current voltage; a flux sensing transformer connected in the secondary of power transformer for sensing the transformer magnetizing current; a bulk voltage sensing circuit connected to the output of the input rectifier and filter circuit; a sample gate circuit connected to the output of the flux sensing transformer and receiving a timing signal from the timing generator; a flux integrator circuit connected to the output of the sample gate circuit; Q1 and Q2 reference summer and modulation control circuits connected to the output of the flux integrator circuit; saw tooth generator connected to the sync signal from the timing generator; a current limiting circuit connected to the Q1 and Q2 reference summer and modulation control circuits and having inputs connected to the current limit sensing transformer; Q1 and Q2 base drive control logic circuits connected to the output of the Q1 and Q2 reference summer and modulation control circuits and receiving timing signals from the timing generator; base drive power pump circuits respectively connected between Q1 and Q2 base drive circuits and the timing generator, the Q1 and Q2 base drive circuits respectively connected to the base of the Q1 and Q2 power transistors; a drive disable and underlap timing circuit connected between the base drive circuits and to the timing generator and supply voltage sensors circuit; an enable circuit connected to the drive disable and underlap timing circuit; a remote shut-off connected to the drive disable and underlap timing circuit; supply voltage sensors connected to the voltage reference and the bulk voltage sensing circuit; and operational maintenance indicators connected to the timing generator and the output of the Q1 and Q2 reference summer modulation control circuits; whereby the flux sensing circuit and flux integrator circuit provides active dynamic flux balancing through a feedback loop, the charge pump voltage balancing circuits provide voltage balancing across the filter capacitors of the input rectifier, the power feedback of output voltage from the output rectifier and filter to the control voltage transformer, rectifier and filter provides for operation of the switching regulated power supply at wider margins of input voltage and allows for interruptions of input power cycles and pulse duration modulation of base drive signals separate from the base power driving the power transistors through the base drive circuits.

One significant aspect and feature of the present invention is charge pump voltage balancing of the capacitors in the input rectifier and filter circuit of the power supply. The circuit dumps charge into the low charge capacitors while the high charge capacitors are driving the power transistors. Accumulatively, this causes a voltage balancing equalizing effect on the capacitors of the input rectifier and filter circuit.

Another significant aspect and feature of the present invention is dynamic flux balancing in dynamically sensing the flux of the power transformer by sensing the magnetizing current in the secondary of the power transformer. The sensed circuit signals are connected to the sample gate circuit which feeds an operational amplifier integrator circuit whose output conditions a reference signal so that the drive pulses for the power head of the power supply are pulse duration modulated, resulting in flux balance in the power transformer.

A further significant aspect and feature of the present invention is power feedback of the voltage from the output rectifier and filter to the unregulated control voltage supply of the power supply. The power feedback provides operation of the switching regulated power supply over wide voltage margins and, depending upon the particular load, provides for operation over at least one missing cycle of the input power.

Having briefly described one embodiment of the present invention, it is a principal object of the present invention to provide a switching regulated power supply operable over broad frequency ranges and broad voltage ranges.

An object of the present invention is to provide a switching regulated power supply which operates on either fifty or sixty cycles AC and on either 115 volts AC or 230 volts AC. The power supply converts the line voltage to direct current voltage which can subsequently be converted to whatever low voltage is required for the logic.

Another object of the present invention is to provide a switching regulated power supply which permits parallel connection of identical power supplies. The supplies can be modularized and paralleled together to provide for determined power output requirements.

The power supply is also designed such that on the unlikely event that one supply fails, the failure of the one supply does not bring down other paralleled supplies.

A further object of the present invention is to provide a switching regulated power supply which feeds back the output of the output rectifier and filter to the input of the unregulated control voltage supply which provides for broad margins of line voltage regulation. This allows the unregulated control voltage power supply to continue to provide voltage even when the field of the control voltage transformer is decaying, as there is still charge stored in the input capacitors of the power supply.

An additional object of the present invention is to provide a switching regulated power supply of the type described which has small physical size and physical weight. The supply particularly lends itself to modularization with identical power supplies. The transformers including the power transformer of the supply are of nominal size and weight on account of the many previously described features such as charge pump voltage balancing, dynamic flux balancing, and power feedback.

BRIEF DESCRIPTION OF THE DRAWINGS

Other objects and many other attendant advantages of this invention will be readily appreciated as the same becomes better understood by reference to the following detailed description when considered in connection with the accompanying drawings, in which like reference numerals designate like parts throughout the figures thereof and wherein;

FIG. 1 is a map illustrating the relationship of FIGS. 1a and 1b;

FIG. 2 is a map illustrating the relationship of FIGS. 2a-2d;

FIGS. 2a-2d illustrate the electrical circuit diagram of the switching regulated power supply; and FIG. 3 illustrates switching waveforms of the switching regulated power supply.

DESCRIPTION OF THE PREFERRED EMBODIMENTS

Figure 1A:
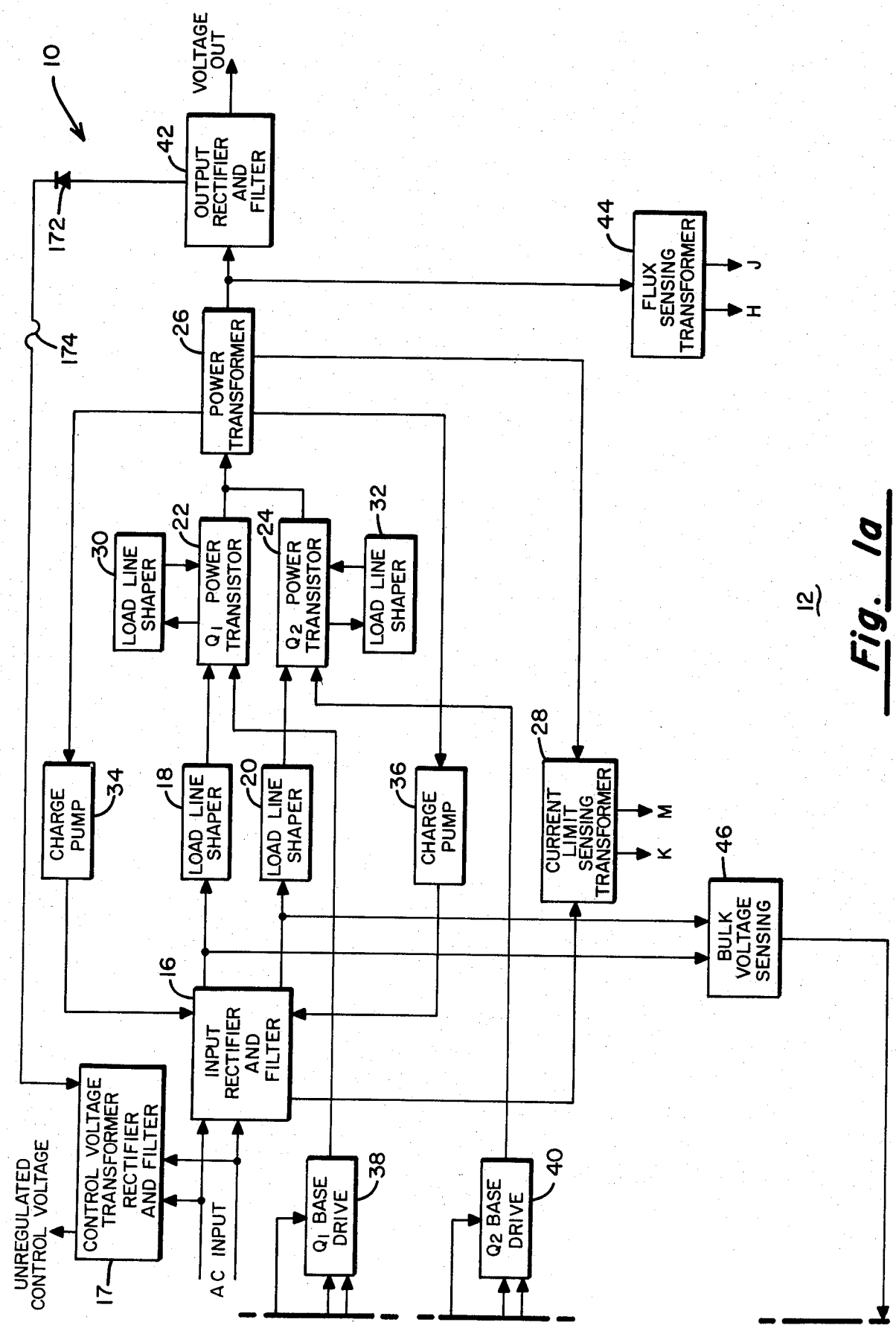
FIGS. 1a and 1b illustrate a block diagram of a circuit of a switching regulated power supply, the present invention.
Figure 1B:
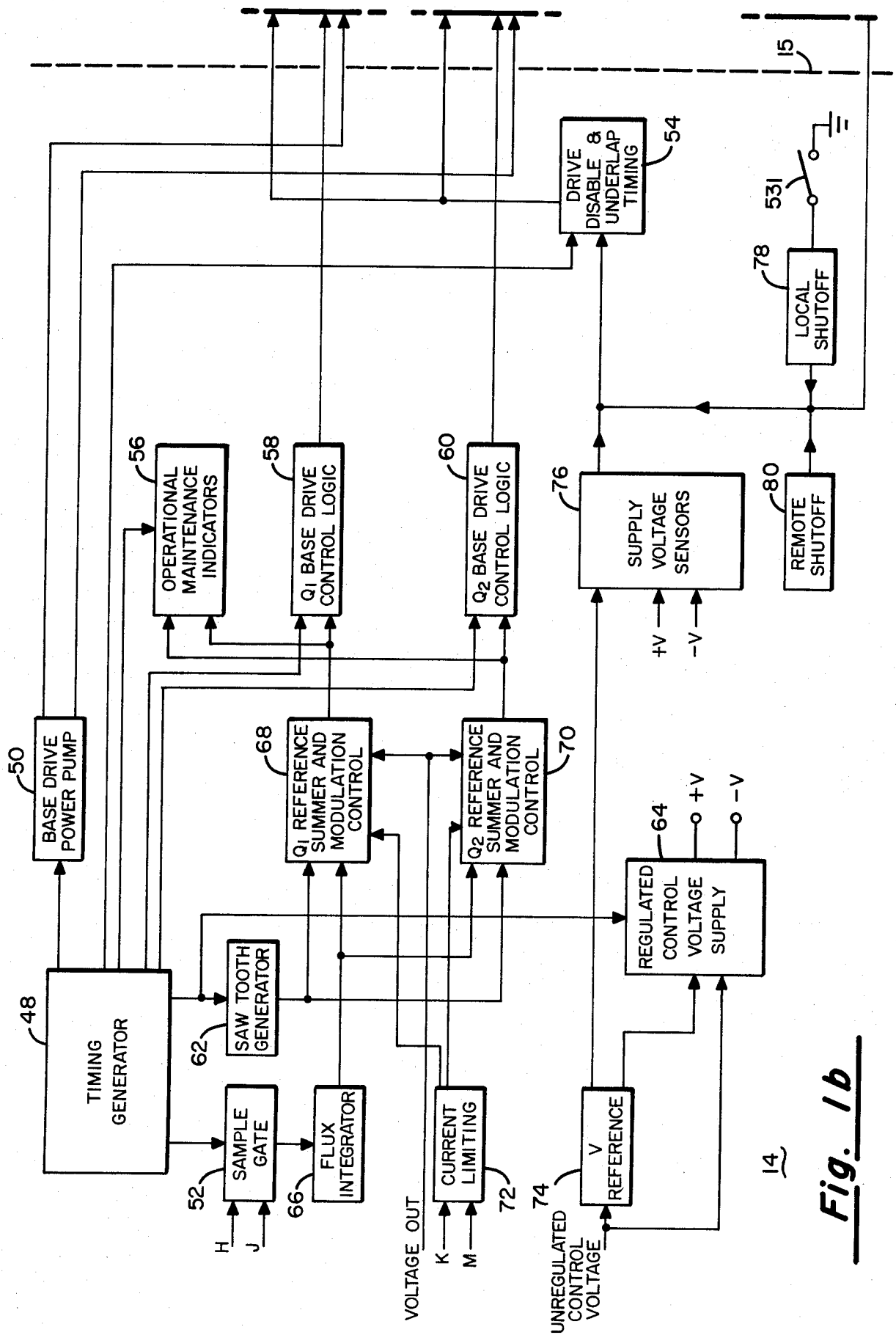

FIGS. 1a and 1b, which illustrate a block diagram of a switching regulated power supply 10, shows the block diagram divided into a power head circuit 12, FIG. 1a, and a control circuit 14, FIG. 1b, on the right the left-hand sides of the vertical dashed line 15 of FIG. 1b of the switching regulated power supply 10. Alternating current connects to full wave bridge rectifiers of an input rectifier and filter circuit 16 and a control voltage transformer, rectifier and filter 17. Load line shaper circuits 18 and 20 respectively connect between power transistors 22 and 24, also denoted as Q1 and Q2 in the block diagram respectively, and the output of the input rectifier and filter 16. One side of the primary winding of a power transformer 26 connects to the common node of the power transistors 22 and 24 respectively, and the other side of the primary winding connects to one side of the current limit sensing transformer 28. The other side of the current limit sensing transformer 28 connects to the input rectifier and filter circuit 16. Load line shaper circuits 30 and 32 respectively connect across the collector-emitter of each of the power transistors 22 and 24. Charge pump voltage balancing circuits 34 and 36 connect between the power transformer 26 and the input rectifier and filter 16 as will be later described in detail. Q1 base drive circuit 38 and Q2 base drive circuit 40 connect to the bases of the power transistors 22 and 24 respectively as is later described in detail. An output rectifier and filter circuit 42 connects to the secondary of the power transformer 26 and outputs regulated direct current voltage. A flux sensing transformer circuit 44 connects between the secondary of the power transformer 26 and the output rectifier and filter 42 as is later described in detail.

A bulk voltage sensing circuit 46 connects to the output of the input rectifier and filter circuit 16 as is later described in detail. A free-running oscillator and timing generator 48 (FIG. 1b) generates timing signals and a sync signal. The timing signals from the generator 48 connect to a base drive power pump circuit 50 which converts to the Q1 and Q2 base drive circuits respectively, a sample gate circuit 52, a drive disable and underlap timing circuit 54, operational maintenance indicators 56, Q1 base drive control logic circuit 58, and Q2 base drive control logic circuit 60. The sync signal from the timing generator 48 connects to a saw tooth generator 62 and a regulated control voltage supply 64. The sample gate circuit 52 connects between the flux sensing transformer 44 and a flux integrator 66. Q1 and Q2 reference summer and modulation control circuits 68 and 70 respectively connect to the saw tooth generator 62 and the flux integrator 66. A current limiting circuit 72 connects between the current limit sensing transformer 28 and the Q1 and Q2 reference summer and modulation control circuits 68 and 70 respectively.

The regulated voltage output of the output rectifier and filter circuit 42 connects to the Q1 and Q2 reference summer and modulation control circuits 68 and 70 respectively. Q1 and Q2 base drive control circuits 58 and 60 respectively connect between the Q1 and Q2 reference summer and modulation controls 68 and 70 and the Q1 and Q2 base drive circuits 38 and 40 respectively. The operational maintenance indicators 56 connect to the Q1 and Q2 reference summer and modulation control circuits 68 and 70 respectively and illuminate a green LED voltage sense light and a yellow LED current sense light. A voltage reference circuit 74 receives unregulated control voltage from the control voltage transformer, rectifier and filter circuit 17 and outputs a reference voltage to the regulated control voltage supply 64 and a supply voltage sensor circuit 76. The regulated control voltage supply 64 provides logic voltage, typically at ±5 volts, to the semiconductor logic integrated circuits of the switching regulated power supply 10. The supply voltage sensor 76 senses plus logic voltage and minus logic voltage. The output of supply voltage sensors 76 and the output of bulk voltage sensing circuit 46 connects to the drive disable and underlap timing circuit 54. A local shutoff circuit 78 and a remote shutoff circuit 80 also connects to the drive disable and underlap timing circuit 54, which connects to Q1 and Q2 base drive circuits 38 and 40 respectively.

Figure 2A:
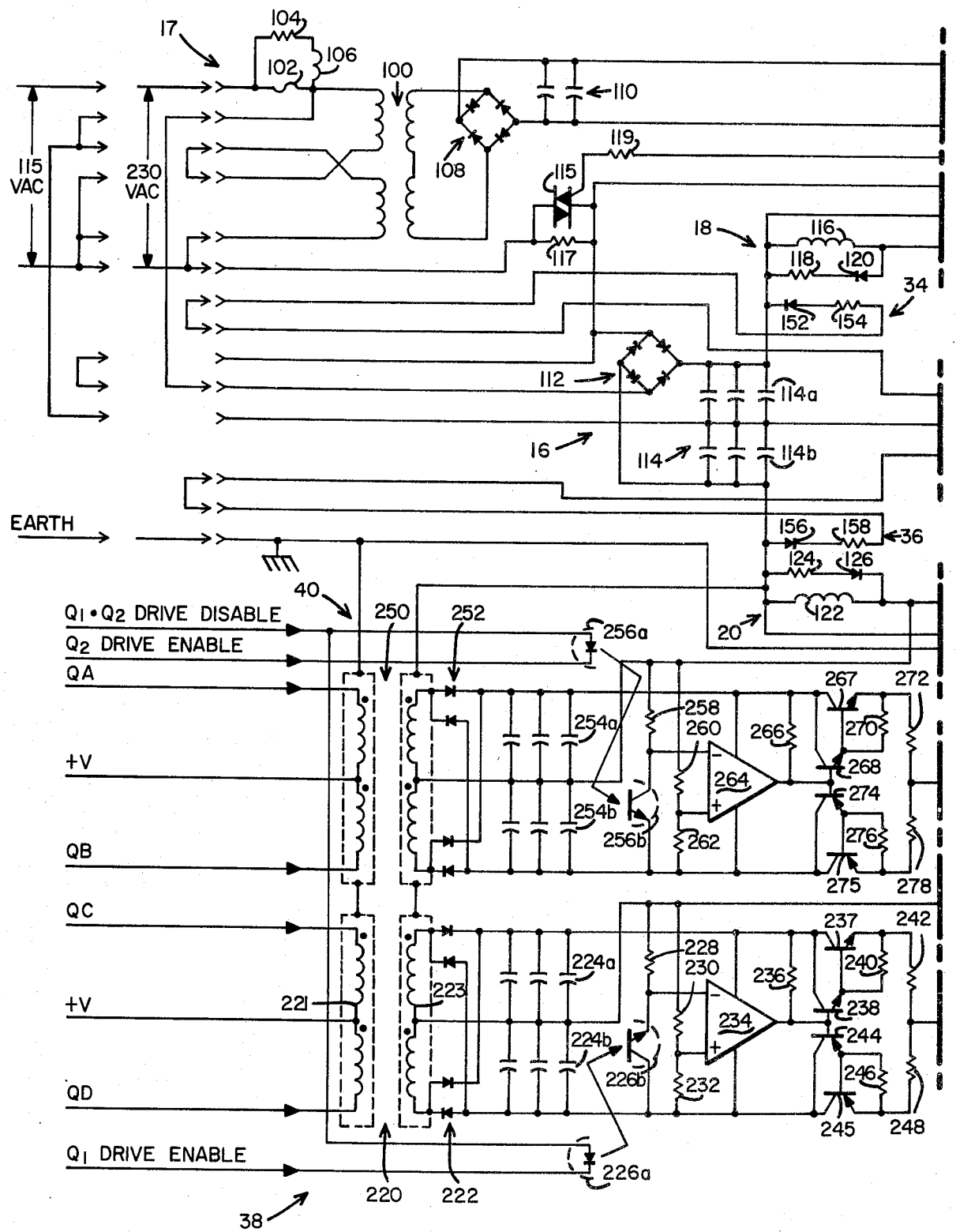

FIGS. 2a and 2b illustrate the power head circuit 12 of the switching regulated power supply 10, and show the control voltage transformer, rectifier and filter circuit 17 including a control voltage transformer 100, having a plurality of tapped primary windings which connect to either 115 volts AC or 230 volts AC. A fuse 102, in parallel with a series connection of a resistor 104 and an indicating light 106 connect in one leg of the primary winding of the transformer 100 which connects to the line voltage. A full wave bridge rectifier 108 connects across the secondary winding of the transformer 100. Two filter capacitors 110 connect in parallel across the full wave bridge rectifier 108 and provide an unregulated control voltage.

A second input rectifier and filter circuit 16 includes a second full wave bridge rectifier 112 connected across the line voltage. A plurality of filter capacitors 114a and 114b connect in series and parallel for 230 volts AC line voltage or in a voltage doubler configuration for 115 volts AC line voltage across the full wave bridge rectifier 112. A triac 115, which may be a Motorola component type MAC15A7, including a resistor 117 in parallel with the triac 115 and a resistor 119 in series with the gate of the triac 115, connects between the line voltage and a "soft start" triac trigger winding 146 of the power transformer 26.

An inductor 116 in parallel with a series connection of a resistor 118 and a diode 120 comprise the load line shaper 18 which connects between the collector of the Q1 power transistor 22 and the one side of the full wave bridge rectifier 112. Likewise, inductor 122, resistor 124, and diode 126 comprise the load line shaper 20 which connects between the other side of the full wave bridge rectifier 112 and the emitter of the Q2 power transistor 24.

A diode 128 in parallel with a parallel connection of a resistor 130 and a diode 132 in series with a capacitor 134 connects across the collector-emitter of the Q1 power transistor 22 and comprises the load line shaper 30. Likewise, the diode 136, a resistor 138, and a diode 140, and a capacitor 142 comprise a load line shaper 32 and connects across the collector-emitter of the Q2 power transistor 24.

The primary winding 144 of the power transformer 26 connects between the common node of the Q1 and Q2 power transistors 22 and 24 respectively and the common node of capacitor network 114a and 114b of the input rectifier and filter circuit 16 through the primary winding of the current limit sensing transformer 28. The power transformer 26 includes the "soft start" winding 146 which connects to the gate of the triac 115, charge pump voltage balance windings 148 and 150 which connect through diodes 152 and 156 in series with resistors 154 and 158 respectively and connect to each side of the capacitor network 114 respectively comprising the charge pump voltage balancing circuits 34 and 36.

Current limit sensing transformer 28 includes a plurality of windings, one winding 153 connected in series with one leg of the primary winding of the power transformer 26, two other windings 167 and 168 connected in series with the charge pump windings 148 and 150 respectively to the junction of the current limiting winding 153 in the one leg of the power transformer 26, and two secondary windings 177 and 178 which output the $Q1_{sense}$ and $Q2_{sense}$ signals.

The secondary winding 151 of the power transformer 26 connects to a full wave bridge rectifier 159 through a primary winding 45 of the flux sensing transformer 44. A resistor 160 in series with a capacitor 162 connect in parallel across the secondary winding 151 of the power transformer 26. The secondary winding 164 of the flux sensing transformer 44 outputs flux imbalance signals. A diode 166 connects in parallel with the output of the full wave rectifier bridge 159. An inductor 169 connects in series with the output of the bridge 159 and the filter capacitor network of filter capacitors 170 filters the output voltage.

A diode 172 and a fuse 174 connect in series between the regulated output voltage and the unregulated control voltage to assist the regulated control voltage supply 64 in supplying current to the control load.

A voltage reference circuit 176, which may be a National Semiconductor component type LH007-0, connects to the output of the full wave bridge rectifier 112. Comparators 182 and 184 connect to the output of the voltage reference circuit 176 and to the output of the full wave bridge rectifier 112 through biasing resistors 192 and 194. Comparators 198 and 200 connect through diodes 202 and 204 to the output of comparators 182 and 184 respectively, and to the output of the voltage reference circuit 176 through biasing resistors 186, 188, and 190. Diodes 206 and 208 connect the outputs of the comparators 198 and 200 to form a latch circuit. Resistors 210, 212, 214 and 216 provide biasing for the opto-couplers 218a and 218b inclusive. As used in the specification, the comparators may be obtained from National Semiconductor Company, as their part number LM 339. The optocouplers referred to herein may be obtained from Hewlett Packard Corporation as type 5082-4361.

Referring to FIG. 2a, the Q1 base drive circuit 38 consists of a transformer 220 having a primary winding 221 which connects to the $Q_C$ and $Q_D$ signals of the base drive power pump 50. A full wave bridge rectifier 222 connects across the secondary winding 223 of the transformer 220. A parallel-series capacitor network 224a and 224b connect across the center tap of the secondary winding and across each side of the output of the full wave bridge rectifier. The center tap of the secondary winding of the transformer 220 connects to the common node of the Q1, Q2 power transistors 22 and 24. Optocouplers 226a and 226b in series with a biasing resistor 228 connect between the center tap of the transformer secondary 223 and one side of the secondary winding. A "Q1 drive enable" signal from Q1 base drive control logic 58 of the control circuit 14 energizes the opto-coupled transistors 226a and 226b and inputs a signal into a minus input of a comparator 234. Biasing resistors 230 and 232 in series connect between the center tap and the one leg of the secondary winding of the transformer 220 and the plus input of the comparator 234. Darlington circuit transistor pair 237 and 238 and 244 and 245 connect from the output of the comparator 234 to the respective legs of the secondary winding of the transformer 220. Resistors 240, 242, 246 and 248 provide biasing. The resistor 242-248 junction connects to the base of the Q1 power transistor 22. The Q2 base drive circuit 40 connects in an identical configuration as the Q1 base drive circuit 38 and connects to the base of the Q2 power transistors 24.

Figure 2C:
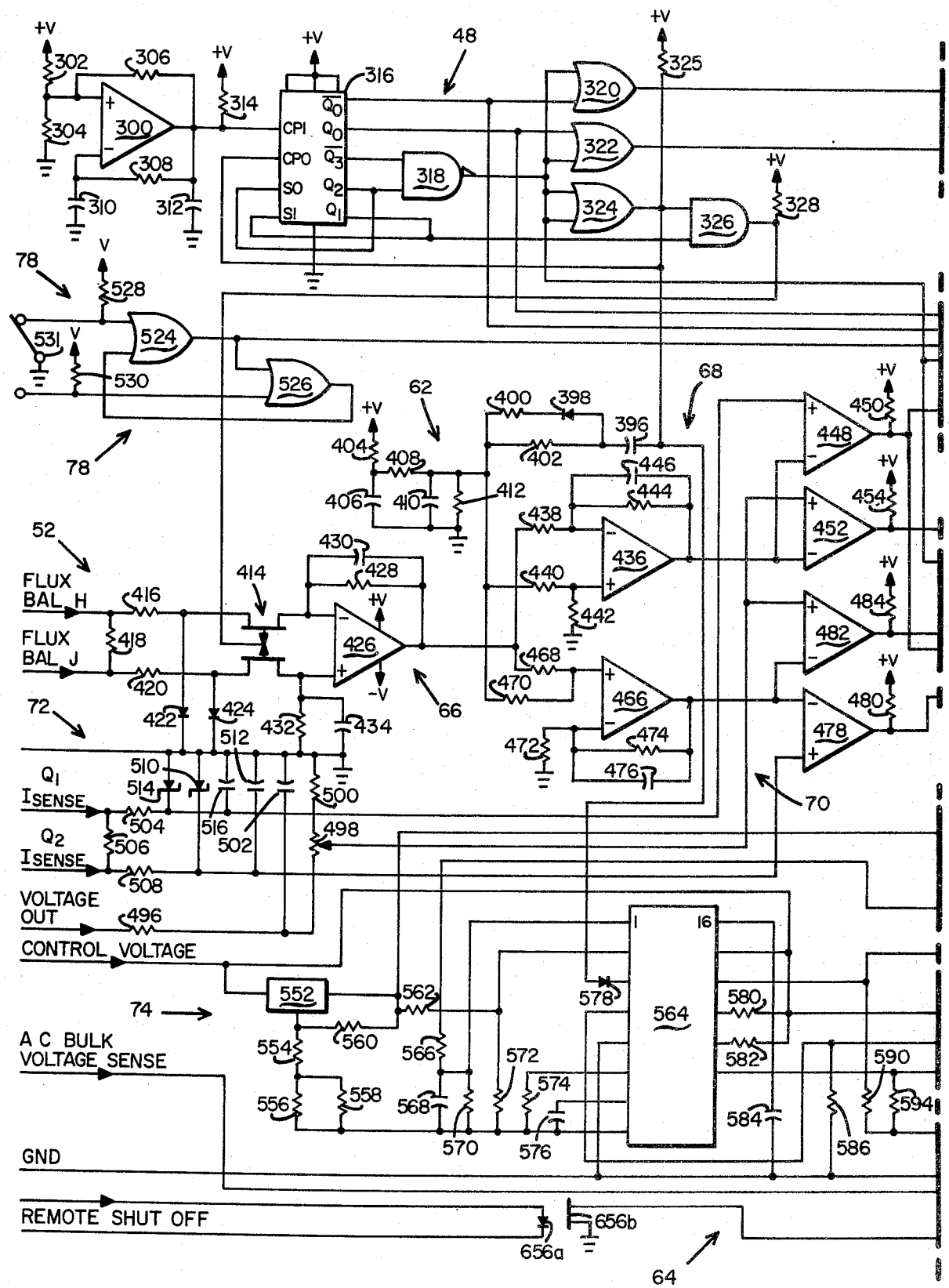
Figure 2D:
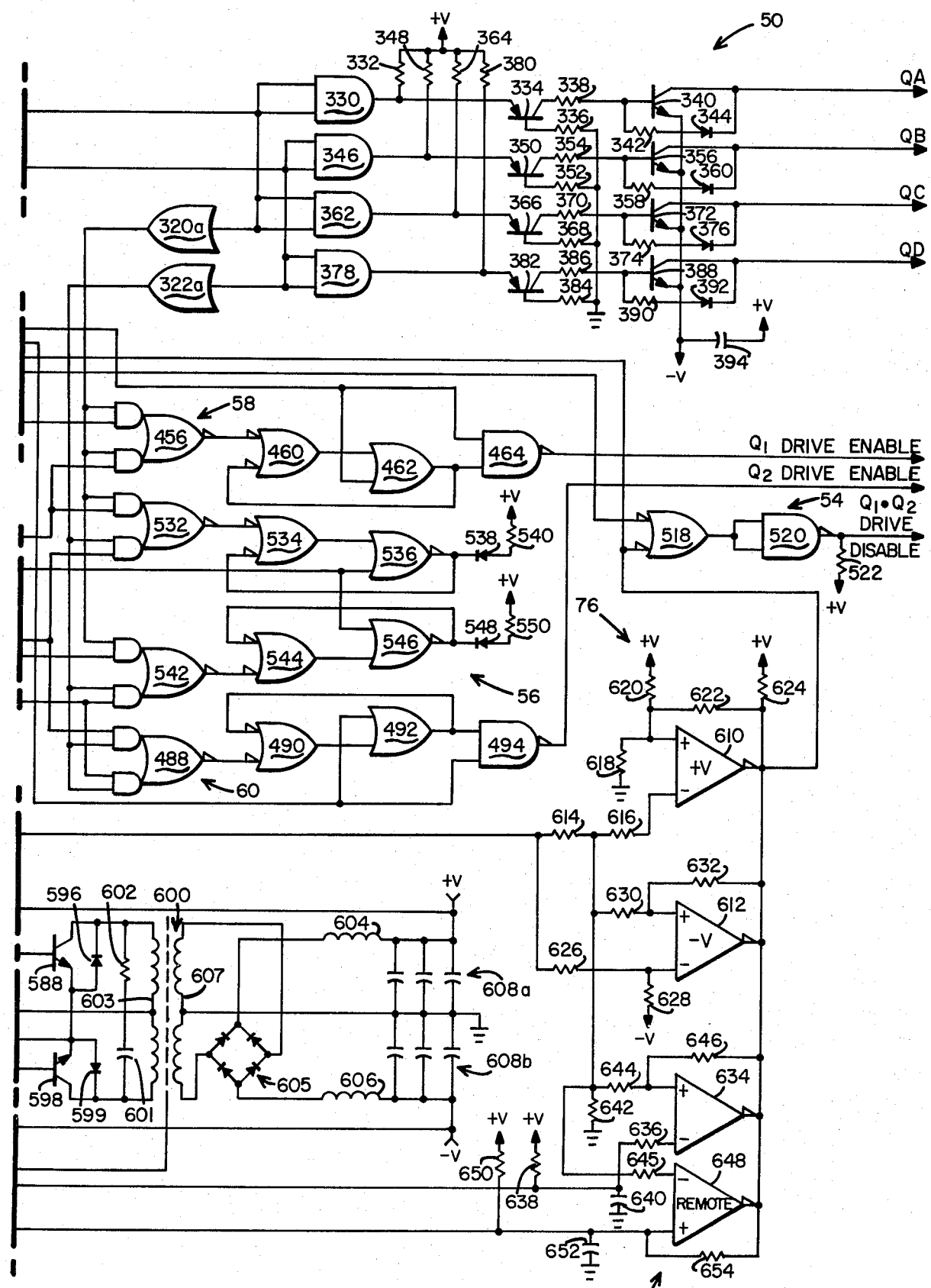

FIGS. 2c and 2d show the timing generator 48 comprising electrical components 300-328 as now described in detail. An operational amplifier 300 along with biasing resistors 302 and 304, feedback resistors 306 and 308 and phase shifting capacitors 310 and 312 form a free-running oscillator which connects to a counter 316. A set resistor 314 connects between the output of the operational amplifier 300 and the input of the counter 316. The counter 316, which may be obtained from Fairchild as type 9305, outputs a plurality of switched waveforms as later described in the waveform diagram of FIG. 3. The logic gates 318-326 connect as illustrated to the output of the counter 316 and to outputs of the logic gates. The output of the logic gates 320 and 322 connects to logic gates 330, 346, 362, and 378 of the base drive power pump 50. Switching transistors 340, 356, 372 and 388 connect to the transformers 220 and 250 of the Q1 and Q2 base drive circuits 38 and 40 of FIG. 2a. A sync signal from the output of the logic gate 324 feeds to the input of the saw tooth generator 62 consisting of components 396-412 connected in a passive integrator configuration and through a diode 578 to a control voltage circuit 564, which may be obtained from Signetics Company as type SG3524. The outputs of the counter 316 also connect to the drive disable and underlap timing circuit 54, the Q1 and Q2 base drive control logic circuits 58 and 60 respectively, and the operational maintenance indicator circuit 56. The output of the logic gate 326 connects to the dual field effect transistor (FET) 414 of the sample gate circuit 52. Resistors 416-420 and diodes 422 and 424 along with the dual FET 414 comprise the sample gate circuit 52. The input of the sample gate circuit 52 connects to the secondary 164 of the flux sensing transformer 44. The inputs of an operational amplifier 426 of the flux integrator circuit 66 connect to the outputs of the dual gate FET transistor 414. A resistor 428 and capacitor 430 connect between the output and one input of the operational amplifier 426. Resistor 432 and capacitor 434 connect between the other input and ground of the amplifier 426. The inputs of the Q1 reference summer 436 and the Q2 reference summer 466 connect to the output of the flux integrator operational amplifier 426 through resistors 438 and 468. The other inputs of the Q1 reference summer 436 connects to the output of the saw tooth generator 62 through resistor networks 440 and 442, and the input of the Q2 reference summer 466 through the resistor 470. Feedback networks of resistor-capacitor 444 and 446, and 474 and 476 connect between the outputs and inputs of the Q1 and Q2 reference summers 436 and 466 respectively. The minus inputs of Q1 voltage limit and Q2 voltage limit modulation control 452 and 482 connect to the outputs of the Q1 and Q2 reference summer 436 and 466 respectively. The plus inputs connect to the regulated voltage output of the output rectifier and filter 42 through the dropping resistor 496 and 500, and the variable resistor 498. The output of the current limiting circuit 72 including the resistor voltage divider network 504-508, Schottky diode 510 and 514, and bypass capacitors 512 and 516, connects to the plus inputs of the Q1 and Q2 current limit amplifiers 448 and 478. The current limiting circuit 72 connects to the secondary of the current limit sensing transformer 28. The minus input of the Q1 and Q2 current limit amplifiers 448 and 478 connect to the outputs of the Q1 and Q2 reference summers 436 and 466 respectively.

The input of the Q1 base drive control logic 58, including logic gates 456-464, connects signals from the counter 316 and the output of the Q1 current and voltage limit amplifiers 448 and 452 to the AND-OR logic gate 456. A Q1 drive enable signal is outputted by the logic gate 464 and connects to the opto-coupled transistor 226a and the Q1 base drive circuit 38. Likewise, logic gates 488-494 comprise Q2 base drive control logic 60. Input signals from the counter 316 and the Q2 current limit 478 and Q2 voltage limit 482 connect to the AND-OR logic gate 488. The logic gate 494 outputs a Q2 drive enable signal which connects to the opto-coupler 256a of the Q2 drive circuit 40. A three terminal positive voltage regulator 552, which may be obtained from National Semiconductor as type LM317, of the voltage reference circuit 74 connects to the unregulated control voltage of the control voltage transformer, rectifier and filter 17. Biasing resistors 554 and 560 connect to the voltage adjust terminal. The output of the regulator 552 connects to the input of a voltage regulator integrated circuit 564 through a resistor 562 and to a plus and minus supply voltage sensor 610 and 612 as later described in detail.

Electrical elements 564-608 comprise the control supply 64, and output plus and minus logic control voltage for the logic circuitry including the integrating circuits and the logic gates through a push-pull transistor 588 and 598 input configuration. The minus inputs of comparators 610 and 612 of the supply voltage sensor circuit 76 connect to the output of the voltage regulator 552 through resistors 614, 616 and 626 respectively.

The comparators 610 and 612, along with the comparator 634, comprise the supply voltage sensor circuit 76. Resistors 618-624 connect to the comparator 610 and resistors 628-632 connect to the comparator 612. Comparator 634 connects to the opto-coupler 218 of the bulk voltage sensing circuit 46. Resistors 636-646 and capacitor 640 connect in the comparator 634. An opto-coupler 656 connects to the input of a remote shut-off comparator 648. Resistors 650 and 654 and capacitor 652 connect in the remote shut-off circuitry. The outputs of the comparators 610, 612 and 634 of the supply voltage sensor circuit 76 and 648 of the remote shut-off circuit 80 connect to the input of the logic gate 518 of the drive disable and underlap timing circuit 54. Logic gate 520 outputs a Q1·Q2 drive disable signal and connects to the opto-couplers 226a and 256a. A local shut-off circuit 78 including a switch 531 and logic gates 524 and 526 comprising a switch debouncing circuit.

Electrical elements 532-550 comprise the operational maintenance indicator circuit 56 including a green LED voltage sense indicator and yellow LED current sense indicator. Logic gates 534 and 536, and 544 and 546 connect in flip-flop electrical circuit configurations. The AND-OR gate 532 connects to the $O_o$ timing signals and the voltage limit signals of the comparators 452 and 482 and the AND-OR gate 542 connects to the $O_o$ timing signals and the current limit signals of the comparators 448 and 478.

PREFERRED MODE OF OPERATION

Power Head Circuit Operation

Operation of the switching regulated power supply 10 commences when three conditions are satisfied when the power supply 10 is connected to a source AC line voltage, either 115 or 230 VAC. First, the plus and minus five volts used to operate the control circuitry must be up to the specified level as sensed by the comparators 610 and 612. Second, the bulk voltage sense must be up to the specified level as sensed by the comparator 634. And third, of course, the switch 531 has to be in the enable position. The comparator 610 senses plus five volts control voltage, the comparator 612 senses minus five volts control voltage, and the comparator 634 senses bulk voltage. A remote shut-off signal connects to the comparator 648 through the opto-coupler 656. If none of the three conditions exist and the switch 531 is enabled, the logic gate 518 has two high inputs which causes a low out, causing a subsequent high out at logic gate 520, which allows the current in the resistor 522 to flow through the opto-couplers 226a or 256a of the base drive circuits 38 and 40 if either of Q1 or Q2 drive enables are active. The bulk voltage sensing circuit 46 is performed by the reference amplifier 176 which yields a ten volt output reference. This level is used as a reference for the turn-on comparator 182 while the turn-off comparator 184 looks at the lower limit of the reference voltage. Hysteresis is automatically incorporated into the comparators 182 and 184 by the latching action of comparators 198 and 200. The reference voltage has to be at a higher level to bring the power supply into operation than is required to run the power supply. The comparators 198 and 200 connect in a flip-flop configuration which drives the opto-coupler 218. The reference and control voltage sensing circuit 74 utilizes the voltage regulator 522, which is adjusted by resistor 558 to a precise value. The output voltage from the regulator 552 is used as the reference for the comparators 610 and 612, which determine whether or not the control plus and minus voltage is of adequate amplitude to allow the power supply 10 to go into operation. The remote shut-off comparator 648 can connect to additional logic circuitry to logically disable the switching regulated power supply 10. The triac 115 of the power head circuit 12 of the switching regulated power supply 10 provides a "soft start" function along with components 117, 119 and turns 146 of the power transformer 26. The "soft start" function prevents undesirable line transients due to the rapid influx of charge into the capacitors 114a and 114b. The triac does not conduct and the resistor 117 establishes maximum current on influx of charge until the power transformer 26 is energized, thereafter turning on the triac 115 and bypassing the resistor 117. The full wave bridge rectifier 112 rectifies off the line AC voltage onto the sets of capacitors 114a and 114b. Ideally, half of the voltage should appear on each pair of the capacitors 114a and 114b.

The power transistors Q1 and Q2 alternately switch driving current to the primary winding of power transformer 26. The control circuit 14 (FIG. 1b) of power supply 10 controls operation of these power transistors within predetermined voltage and current limits, to the extent such control may be maintained within the power transistor drive time limits set by counter 316. This control is exercised by selective activation of the "Q1 drive enable" and "Q2 drive enable" signals into the respective Q1 and Q2 base drive circuits. When either of these signals are not activated the respective power transistor is switched off, and when both are not activated current ceases to flow in the primary winding of transformer 26. However, even during this last condition magnetization current continues to flow through the secondary winding of transformer 26 because of the flux store in the core of transformer 26. During this dead time or "non-drive" time of Q1 and Q2, inductor 169 provides current for the output load of the power supply 10.

Counter 316, which is a part of timing generator 48, provides the clock pulses which control the overall cyclical operation of power transistors Q1 and Q2, and drives them at a nominal switching rate of approximately 20,000 cycles per second. The aforementioned control of Q1 and Q2 to maintain operation within predetermined voltage and current limits occurs instantaneously during any cycle or cycles of operation within the nominal switching rate.

Charge Pump Bulk Voltage Balancing Circuit Operation

Charge pump bulk voltage balancing occurs on the pairs of capacitors 114a and 114b such that the charge is loaded onto one pair and subtracted from the other pair. Windings 148 and 150 of the power transformer 26, which have one more turn than the turns of the primary winding of the power transformer 26, provide the pumping of charge from the higher voltage-charged capacitors to the lower voltage-charged capacitors. Charge is dumped into the low capacitors when the alternate side of the power transformer 26 is energized, causing an accumulated charge balancing effect between the capacitors. The degree of imbalance that can be tolerated in the circuitry is determined by the size of the resistors 154 and 158, which in the preferred embodiment are 15 ohm resistors. For example, if the voltage across a top capacitor 114a is lower than the voltage across a bottom capacitor 114b, when power transistor Q1 drives the voltage is impressed across the windings 148 by a factor of 41/40 because of the ratio of the turns between windings 148 and 144 of the transformer 26. (The extra turn overcomes the diode resistance 152.) When Q1 is driving, the dot in the primary winding 144 indicates a positive voltage and the dots on the windings 148 also indicate a positive voltage. Therefore, the diode 152 is reversed biased when Q1 is driving. So in effect, this means that charge is not dumped into the capacitors 114a while drawing charge from these capacitors. Due to the lower voltage on the capacitors 114a, the potential is not adequate to overcome the reverse biasing effect by the bottom set of the capacitors 114b. While Q2 drives, charge is dumped into the low voltage capacitors 114a while the alternate winding 150 is energized. Accumulatively, this causes the balancing effect between the capacitors 114a and 114b. The charge pump bulk voltage balancing by the windings 148 and 150 and the components 152 and 154 and 156 and 158 provide balancing of potential between the capacitors 114a and 114b.

Dynamic Flux Balancing Circuit Operations

Dynamic flux balancing occurs by sensing the magnetizing current in the secondary 151 of the power transformer 26 with the flux sensing transformer 44. The sensed current information connects to the integrating operational amplifier 426 and subsequently the current information is used to generate a voltage signal which is proportional to the magnitude of the magnetizing current. This voltage signal is combined with a reference signal to cause a corrective pulse duration modulation of the drive pulses for the power transistors Q1 and Q2. The flux sensing transformer 44 senses the magnetizing current in the secondary 151 of the power transformer 26. The sensed signal is sampled by the sample gate 52 of the control circuitry 14 and subsequently feeds into the flux integrator 66 which develops a signal that is proportional to the integral of the magnetizing current. Capacitor 430 is an integrating capacitor and resistor 428 is the decay resistor. If for example, positive magnetizing current predominates, an offset voltage appears at the output of the operational amplifier 426 which conditions the Q1 and Q2 reference summer and modulation control signals such that the drive pulses for the transistors Q1 and Q2 are pulse duration modulated, causing flux balance to occur. The conditioned outputs of the Q1 and Q2 reference summer and modulation control circuits 68 and 70 are compared with the voltage and current limiting signals, causing pulse duration modulation to occur in such a fashion as to control the dynamic flux balancing. In summary, the dynamic flux balancing feedback loop in the power supply 10 senses the magnetizing current in the power transformer secondary winding, samples the sensed signal, integrates the signal and modifies the Q1 and Q2 reference signals in such a fashion as to cause the Q1 and Q2 drive times to be modulated in a manner causing flux balancing.

Dynamic flux balancing is compatible with bulk voltage balance at one unique point where the power supply 10 is in perfect balance. At this point, the system is stable. However, as soon as there is diversion from this point, a regenerative action with flux balancing tends to draw more charge from one set of the filter capacitors 114a/114b than from the other set. When operating in the straight input bridge rectifying mode, this unbalancing necessitates the charge pump to restore the bulk voltage balance.

Time Modulation Circuit Operation

The Q1 and Q2 reference summers 68 and 70 are connected so that when signals are applied on the plus terminals of operational amplifiers 436 and 466 the signals are added to the output in proportion to the amplifier gain, and signals applied on the minus terminal are subtracted from the output in proportion to the amplifier gain. The resultant signal is the arithmetic sum of the input signals. For instance, the Q2 reference summer 466, the reference (sawtooth) signal is applied to resistor 470 and the flux balancing signal is applied to resistor 468. The resistors connect to the positive terminal of the summer 466 causing the output of the summer 466 to be additive. The reference signal is generated by sawtooth generator 62 synchronized to the timing generator 48. The sawtooth wave rides about a 2.5 volt reference level so that the waveform is added to the output of the flux integrator, and appears at the output of the Q2 reference summer 466. By contrast, the reference sawtooth signal input to summer 436 is coupled to the positive input terminal and the flux integrator output signal connects into the negative terminal of the summer 436 so that the output from 436 is subtractive. Positive signals from the output of the amplifier 426 tend to shorten the drive time of Q1 and stretch the drive time of Q2 while negative signals do the opposite. This action causes more flux on the side that has the least magnetizing current or increases the volt-time integral on the side that is deficient in volt-time integral and thus causes the flux balance to occur in the power transformer 26.

Referring to FIG. 2b, the current limit transformer 28 senses the current in the primary of the power transformer 26 and subsequently connects to the current limiting circuit 72, developing a potential which subsequently connects to the non-inverting inputs of comparators 448 of the Q1 current limit circuit and 478 of the Q2 current limit circuit. When the power supply 10 is heavily loaded to the point where current limiting or aabove is reached, the comparator establishes that current limit. The point that this limit is established is determined by the windings ratio of the current limit transformer 28 and resistor 506, which is a loading resistor for the current limit transformer 28. By increasing the resistance, the current limit can be decreased. The center winding 153 of the current limit transformer 28 couples the primary current into the sensing windings 177 and 178 of the current limiting transformer. The current limit windings 167 and 168 are also in series with the charge pump windings 148 and 150 and are such a polarity as to subtract from the primary current the amount of current equal to the charge pump current. So in actuality, the current sensing ignores the charge pump current.

Base Drive Circuit Operation

The AND-OR gates 456 and 488 of the Q1 and Q2 base drive control logic 58 and 60 take the pulse duration modulated signals from the comparators 448 and 452, and 478 and 482, and also signals from the counter 316, and develop resultant signals which are applied to the base drive control circuits 38 and 40. Logic gates 460 and 462 and 490 and 492 form drive flip-flops. For so long as both inputs to logic circuit 518 are high, the flip-flops drive the power transistors alternatively. Only one of the outputs of the flip-flops will be high at any given time, the outputs are mutually exclusive, and furthermore, the outputs underlap each other so that there is a dead time when neither output is high. In the event that neither current nor voltage limit on one cycle is reached, the switching cycle runs to the time limit of the counter 316. On the event of current limit or voltage limit, the drive flip-flops are cleared, stopping the current flow through the opto-couplers 226 and 256 respectively.

The Q1 base drive and Q2 base drive circuits 38 and 40 of FIG. 2a respectively separate the base drive control signals and the base drive power signals. The power is delivered to transformers 220 and 250 by the base drive power pump 50. The base drive control signals are delivered from the output of the Q1 and Q2 base drive control logic circuits 58 and 60 through the opto-couplers 226 and 256 respectively. When current is driven through the Q1 drive enable, thereby turning on the opto-coupler 226, conduction occurs causing the comparator 234 to swing its output signal positive. With the output positive, the transistors 237 and 238 go into conduction driving positive current into the base of the Q1 power transistor 22. At the end of the drive, the current through the opto-coupler 226 ceases, which causes the collector of the opto-coupler 226 to cease conducting current, thereby causing the output of the comparator 234 to go negative, which causes the transistors 244 and 245 of the Darlington circuit pair to go into conduction pulling the base charge out of the Q1 power transistor thereby turning it off rapidly. The operation is likewise for the Q2 power transistor.

Operational Maintenance Circuit Operation

The operational maintenance indicators 56 include a green LED 538 indicating voltage limit and a yellow LED 548 indicating current limit. If both of the LED's are lit, the lighting of the LED's indicates a normal operating situation. If one or the other of the LED's are lit, it indicates a normal operating condition. If neither one of the LED's are lit, generally this is an abnormal operating situation.

Power Feedback Circuit Operation

In the event that the line power falls below normal, power feedback occurs from the output of the power supply back to the bulk power for the control voltage supply 64 through the diode 172. This allows operation of the power supply 10 at a lower voltage margin. Once the 30 volts in the input rectifier and filter supply comes up, and if the line voltage should thereafter fail, the energy storage in the capacitors 114 is enough to bridge a full cycle at full load or for a longer period of time at less than full load. In the event that the input power totally falls away for a full cycle, the power supply 10 continues to operate the control voltage supply 64 since the supply is being powered by the output of the output rectifier and filter 42. This extends the voltage operating margin.

If the supply is designed to operate at a nominal voltage of 115 volts, it will continue to operate at voltages down to about 80 volts. While the power supply begins normal operation at about 100 volts, the power supply can run at a lower voltage once the power supply is in operation. From a percentage standpoint, the supply operates at 90 percent of nominal line voltage and ceases operating at 75 percent of nominal line voltage.

Switching Waveforms

FIG. 3 illustrates switching waveforms for the switching regulated power supply 10. CP1 is the signal generated by the free-running oscillator 300 have a frequency of about 320 kilohertz and a pulse width of about 1.5 microseconds. Q1, Q2, $\overline{Q3}$, $Q_o$, and $\overline{Q_o}$ are switching signals outputted by the counter 316. $\overline{Q2 \cdot Q3}$ is formed at the output of the logic gate 318 and is equal to $\overline{CP0}$. $Q_o$ and $\overline{Q_o}$ set the drive flip-flops for the Q1 and Q2 power transistors respectively. The $Q_o$ timing signal sets the drive flip-flop for the $Q_1$ power transistor when the $Q_o$ timing signal goes low. Drive does not commence until the set signal $Q_o$ goes high because a low signal holds the output of 464 high which prevents current from being drawn through the opto-coupler 226a. By holding the flip-flop set, the $Q_1$ power transistor cannot be driven, but once the set function is removed, the flip-flop drives $Q_1$ if the underlap signal is zero, if the input voltages are correct, and there is no remote or local shut-off signal. This subsequently allows current to flow to the $Q_1$ power transistor. The conditions for the $Q_2$ power transistor are analagous to those for the $Q_1$ power transistor except that $\overline{Q_o}$ is the complementary set signal for the flip-flops to drive the $Q_2$ power transistor. $Q_o$ and $\overline{Q_o}$ are of course the inverse of each other. The $Q_1$ and $Q_2$ drive enable-drive disable signals include retrace time of the ramp from negative to positive and then the down ramp again for modulation regulation. The SK signal is the sample gate signal from the output of the AND gate 326 applied to the common gate of the FET transistor pair 414 for the sample gate circuit 52. The final two waveforms are the power pump Q1 waveform and the power pump Q2 waveform for powering the power transistors through the base drive power pump circuits. The transistor switches alternate driving power to the transformers 220 and 250 of the Q1 and Q2 base drive circuits 38 and 40 respectively in a push-pull fashion.

Certain components in the preferred embodiment of the present invention are specially selected or constructed in order to provide the preferred performance of the invention. A number of these components have heretofore been identified in the specification, and the following table lists others of these components together with their common commercial designations or constructional materials:

| Transistor 22 and 24 | Type 2N6560 or 2N6583 |
|---|---|
| Transformer 26 | Core: Ferroxcube EC70 |
| | Winding 144: 40 turns 15 ga. wire |

| | -continued |
|---|---|
| | Winding 151: 16 turns, 4 parallel, #19 ga. wire |
| | Winding 146: 4 turns, 32 ga. wire |
| | Winding 148,150: 41 turns ea., 32 ga. wire |
| Transformer 28 | Core: Ferroxcube 2213P |
| | Winding 167,168: 3 turns, 32 ga. wire |
| | Winding 153: 3 turns, 17 ga. wire |
| | Winding 177,178: 50 turns, 32 ga. wire |
| Transformer 44 | Core: Ferroxcube 2213P |
| | Winding 45: 1 turn .006" × .260" copper foil |
| | Winding 164: 50 turns centertapped, 28 ga. |
| Transformer 220 | Core: Ferroxcube 2213P |
| | Winding 221: 90 turns centertapped, 28 ga. bifilar |
| | Winding 223: 54 turns centertapped, 28 ga. bifilar |
| Transformer 250 | Core: Ferroxcube 2213P |
| | Winding 221: 90 turns centertapped, 28 ga. bifilar |
| | Winding 223: 54 turns centertapped, 28 ga. bifilar |
| Transformer 100 | Signal Transformer Co. Type #24-500 |
| Transformer 600 | Core: Ferroxcube 2213P |
| | Winding 603: 50 turns centertapped, 28 ga. bifilar |
| | Winding 607: 50 turns centertapped, 28 ga. bifilar |
| Inductor 604 & 606 | Core: Arnold Engineering Inc. #A-143067-2; 54 turns 24 ga. wire |
| Inductor 116 & 122 | Core: Arnold Engineering Inc. #A-143067-2; 13 turns 17 ga. wire |
| Inductor 169 | Core: Arnold Engineering Inc. #A-759135-2; 47 turns 12 ga. wire. |

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A switching regulated power supply comprising:
   (a) power head means for converting an alternating input voltage to a direct current output voltage, including an input rectifier and filter having filter capacitors connected to said alternating input voltage, a power transformer having primary and secondary windings, and having its primary winding connected to said input rectifier and filter, an output rectifier and filter connected to said power transformer secondary winding, and a pair of power transistors connected between said input rectifier and filter and said power transformer primary winding, and a flux sensing transformer connected to the secondary winding of said power transformer;
   (b) charge pump means for equalizing voltage charge on said input rectifier and filter, coupled between said power transformer primary winding and said input rectifier and filter;
   (c) control means for alternately switching said power transistors; and
   (d) dymamic flux balancing means for controlling the flux in said power transformer, connected between said flux sensing transformer and said control means; whereby said charge pump means balances the voltage charge on the filter capacitors of said input rectifier and filter, and said flux sensing transformer senses magnetizing current in the secondary winding of said power transformer and said dynamic flux balancing means converts said sensed magnetizing current into signals to said control means and said control means thereby controls the time and duration of conduction of both of said power transistors.

2. The switching regulated power supply of claim 1, further comprising:
   (a) a control voltage supply connected between said input rectifier and filter and said control means; and,
   (b) power feedback means connecting power from said power head means to said control voltage supply whereby said power feedback provides operation of the switching regulated power supply at low margins of input voltage, and bridges at least one full cycle at full load or more than one cycle at less than full load in the event that the input power falls away.

3. The switching regulated power supply of claim 1, further comprising load line shapers connected between said input rectifier and filter and said power transistors and across the collector-emitter of said power transistors.

4. The switching regulated power supply of claim 2, further comprising:
   (a) voltage reference means connected between said input rectifier and filter and said control voltage supply; and
   (b) AC bulk voltage sensing means connected to said input rectifier and filter.

5. The switching regulated power supply of claim 4 further comprising remote shut-off means and enable means connected to said power head means.

6. A switching regulated power supply comprising:
   (a) power head means for converting an alternating current voltage input to a direct voltage output, comprising an input rectifier and filter having filter capacitors, a power transformer connected to said input rectifier and filter, an output rectifier and filter connected to said power transformer, and a pair of power transistors connected between said input rectifier and filter and said power transformer;
   (b) charge pump means for balancing the voltage charge on said filter capacitors, connected between said power transformer and said filter capacitors; and
   (c) control means for alternately switching said power transistors, whereby said charge pump means balances the charge on said filter capacitors in said input rectifier and filter by pumping charge from high potential to low potential capacitors.

7. A switching regulated power supply comprising:
   (a) power head means for converting alternating current input voltage to direct current output voltage, including an input rectifier and filter having a plurality of filter capacitors, a pair of power transistors connected to said filter capacitors, a power transformer having a primary winding connected to said power transistors, and having a secondary winding, an output rectifier and filter connected to said power transformer secondary winding, and a flux sensing transformer coupled to a secondary winding of said power transformer;
(b) charge pump means for equalizing voltage charge on said input rectifier and filter, coupled between said power transformer primary winding and said input rectifier and filter;
(c) control means for controlling the time and duration of switching of said power transistors, connected to said power transistors; and
(d) dynamic flux balancing means for controlling the flux in said power transformer, connected between said flux sensing transformer and said control means; whereby said flux sensing transformer senses magnetizing current in the secondary winding of said power transformer, and said dynamic flux balancing means receives said sensed magnetizing current and develops a time modulating signal, and said control means receives said time modulating signal to control the switching time of said power transistors.

8. A switching regulated power supply comprising:
(a) power head means for converting an alternating current voltage to direct current voltage, including an input rectifier and filter capacitor means for developing an unregulated direct current voltage from said alternating current voltage input, a pair of power transistors connected to said input rectifier and filter capacitor means, a power transformer connected to said power transistors, and an output rectifier and filter connected to said power transformer;
(b) charge pump means for equalizing voltage charge on said input rectifier and filter capacitor means, coupled between said power transformer and said input rectifier and filter capacitor means;
(c) control logic means for alternately switching said power transistors and a control voltage means for supplying power to said control logic means; and
(d) power feedback means for regulating the direct current output voltage from said power head means, connected between said power head means and said control voltage means, whereby said power feedback means provides control voltage power to said control voltage means.

9. A switching regulated power supply comprising:
(a) power head means for converting alternating current input voltages to direct current output voltages, including an input rectifier and filter, a power transformer connected to said input rectifier and filter, an output rectifier and filter connected to said power transformer, and a pair of power transistors connected between said input rectifier and filter and said power transformer;
(b) charge pump means for equalizing voltage charge on said input rectifier and filter, coupled between said power transformer and said input rectifier and filter;
(c) control drive means for controlling the switching of said power transistors;
(d) control means for developing alternating signals to said control drive means, thereby alternately switching said power transistors; and
(e) time division modulation means for time division modulating said control means whereby said time division modulation means pulse modulates said control drive means.

10. A switching regulated power supply comprising:
(a) power head means for converting an alternating input voltage to a direct current output voltage, including an input rectifier and filter connected to said alternating current voltage capable of being configured as a voltage doubler, a power transformer having primary and secondary windings, and having its primary winding connected to said input rectifier and filter voltage doubler, an output rectifier and filter connected to said power transformer secondary winding, and a pair of power transistors connected between said input rectifier and filter and said power transformer primary winding, and a flux sensing transformer connected to the secondary winding of said power transformer;
(b) charge pump means for equalizing voltage charge on said input rectifier and filter, coupled between said power transformer primary winding and said input rectifier and filter;
(c) control means for alternately switching said power transistor; and
(d) dynamic flux balancing means for controlling the flux in said power transformer, connected between said flux sensing transformer and said control means; whereby said flux sensing transformer senses magnetizing current in the secondary winding of said power transformer and said dynamic flux balancing means converts said sensed magnetizing current into signals to said control means and said control means thereby controls the time and duration of conduction of both of said power transistors.

11. The switching regulated power supply of claim 10, further comprising:
(a) a control voltage supply connected between said input rectifier and filter and said control means; and
(b) power feedback means connecting power from said power head means to said control voltage supply whereby said power feedback provides operation of the switching regulated power supply at low margins of input voltage, and bridges at least one full cycle at full load or more than one cycle at less than full load in the event that the input power falls away.

12. The switching regulated power supply of claim 11, further comprising load line shapers connected between said input rectifier and filter and said power transistors and across the collection-emitter of said power transistors.

13. The switching regulated power supply of claim 12, further comprising:
(a) voltage reference means connected between said input rectifier and filter and said control voltage supply; and
(b) AC bulk voltage sensing means connected to said input rectifier and filter.

14. The switching regulated power supply of claim 13 further comprising remote shutoff means and enable means connected to said control voltage supply.

15. Switching regulated power supply comprising:
input rectifier and filter circuit having filter capacitors connected to an input source of alternating current and outputting a control voltage, voltage reference circuit connected to the control voltage, control voltage supply connected to the output of the voltage reference circuit and connected to the control voltage, freerunning oscillator and timing generator outputting a plurality of timing signals and outputting a sync signal which connects to the control voltage supply, a power transformer having primary and secondary windings and charge pump windings, first load line shaper circuits connected to said input rectifier and filter circuit, power transistors connected between said first load line shaper circuits and the primary winding of said power transformer, second load line shaper circuits connected across the output of each of said power transistors, current limiting sensing transformer connected between the primary winding of said power transformer and said input rectifier and filter circuit, charge pump voltage balancing circuits connected between the charge pump windings of said power transformer and said input rectifier and filter circuit, output rectifier and filter circuit connected to the secondary winding of said power transformer outputting a direct current voltage out and further connected to said input rectifier and filter circuit, flux sensing transformer connected in series with the secondary winding of said power transformer thereby sensing the magnetizing current, AC bulk voltage sensing circuit connected to the output of said input rectifier and filter circuit, sample gate circuit connected to the output of said flux sensing transformer and receiving a timing signal from said freerunning oscillator and timing generator, flux integrator circuit connected to the output of said sample gate circuit, sawtooth generator synced to said sync signal from said freerunning oscillator and timing generator, current limiting circuit which connects to the output of said current limiting sensing transformer, power transistor reference summer and modulation control circuits connected to the output of said flux integrator circuit and further connected to the current limiting circuit, to the sawtooth generator, and to the direct current voltage out of said output rectifier and filter, power transistor base drive control logic circuits for generating time modulated base drive signals connected to the output of the power transistor reference summer and modulation control circuits and receiving timing signals from said freerunning oscillator and timing generator, base drive power pump circuits connected to said freerunning oscillator and timing generator, power transistor base drive circuits for providing base power which drives the power transistors connected between said power transistors base drive control logic circuits and said power transistors and further connected to said base drive power pump circuits, drive disable and underlap timing circuit connected between said power transistor base drive circuits and said freerunning oscillator and timing generator and further connected to said AC bulk voltage sensing circuit, supply voltage sensors circuit connected between said drive disable and underlap timing circuit and said voltage reference circuit, enable circuit connected to said drive disable and underlap timing circuit, remote shut-off connected to said drive disable and underlap timing circuit, and operational maintenance indicators connected to said freerunning oscillator and timing generator and the output of said power transistors reference summer and modulation control circuits whereby said flux sensing transformer and flux integrator circuits provide active dynamic flux balancing through a feedback loop, said charge pump voltage balancing circuits provide charge pump voltage balancing across the filter capacitors of said input rectifier and filter circuit, power feedback of the direct current voltage out from said output rectifier and filter to said control voltage supply provides for operation of the switching regulated power supply at lower margins of input voltage and bridges at least a full cycle at full load or more than one cycle at less than full load in the event that the input source of alternating current falls away, and time modulated base drive signals separate the base power driving the power transistors through said power transistor base drive circuits.

* * * * *